(12) United States Patent
Wilfer

(10) Patent No.: US 8,323,712 B2
(45) Date of Patent: Dec. 4, 2012

(54) PROCESS FOR PRODUCING RAW SAUSAGE WITH SHORTENED RIPENING TIME

(75) Inventor: Robert Wilfer, Versmold (DE)

(73) Assignee: Kalle GmbH, Wiesbaden (DE)

( * ) Notice: Subject to any disclaimer, the term of this patent is extended or adjusted under 35 U.S.C. 154(b) by 430 days.

(21) Appl. No.: 12/542,781

(22) Filed: Aug. 18, 2009

(65) Prior Publication Data

US 2010/0047417 A1 Feb. 25, 2010

(30) Foreign Application Priority Data

Aug. 20, 2008 (DE) .......................... 10 2008 038 565

(51) Int. Cl.
*B65B 55/00* (2006.01)
(52) U.S. Cl. .......................... 426/415; 426/105; 428/34.8
(58) Field of Classification Search ................ 428/34.8; 426/129, 135, 138, 410, 105
See application file for complete search history.

(56) References Cited

U.S. PATENT DOCUMENTS

| | | | | |
|---|---|---|---|---|
| 3,664,850 A | * | 5/1972 | Kentor | 426/332 |
| 4,546,023 A | * | 10/1985 | Kastl et al. | 138/118.1 |
| 5,773,057 A | * | 6/1998 | Singh | 426/61 |
| 5,852,114 A | | 12/1998 | Loomis et al. | |

FOREIGN PATENT DOCUMENTS

| | | |
|---|---|---|
| DE | 195 07 578 A1 | 9/1996 |
| DE | 103 20 327 A1 | 12/2004 |
| DE | 103 43 409 A1 | 4/2005 |
| EP | 1 668 988 A1 | 6/2006 |
| GB | 1 397 472 | 6/1975 |
| WO | WO 97/49302 A1 | 12/1997 |
| WO | WO 00/75220 A1 | 12/2000 |
| WO | WO 2005/002848 A1 | 1/2005 |

* cited by examiner

*Primary Examiner* — Rena Dye
*Assistant Examiner* — Chaim Smith
(74) *Attorney, Agent, or Firm* — ProPat, L.L.C.

(57) ABSTRACT

A process accelerating the ripening of raw sausages by incorporating a casing having a water vapor permeability of less than 600 g/m² d at a relative humidity of less than 60%. Preferably, the process employs casings having a water vapor permeability of 50 to 400 g/m² d, more preferably 70 to 300 g/m² d, particularly preferably 80 to 200 g/m² d. The process concerns, in particular, single-layered or multilayered casings made of thermoplastics, optionally also coated textile fiber skins or cellulose fiber skins.

7 Claims, No Drawings

PROCESS FOR PRODUCING RAW SAUSAGE WITH SHORTENED RIPENING TIME

CROSS-REFERENCE TO RELATED APPLICATIONS

This application claims priority to German Patent Application No. 10 2008 038 565.4 filed Aug. 20, 2008 which is hereby incorporated herein by reference in its entirety.

FIELD OF THE INVENTION

The invention relates to a process for the accelerated ripening of raw sausage, and also the use of special casings for this purpose.

BACKGROUND OF THE INVENTION

Raw sausages are defined in the guidelines of the German Food Codex as "reddened sausage products which are storable without refrigeration, and generally eaten raw. With a ripening of raw meat, combined with drying out, they have become sliceable or spreadable". A distinction is made between sliceable raw sausage (e.g. Salami, Plockwurst, Cervelatwurst or Landjäger) and spreadable raw sausage (e.g. Teewurst or Mettwurst).

In the case of ripening, a distinction is made between slow ripening, standard ripening and rapid ripening. In rapid ripening, for the reddening, conventionally glucono-δ-lactone is admixed which reduces the pH in the emulsion in the course of a few hours (to about pH 5.6). The acidification can also be accelerated by adding sugar to the emulsion.

Customarily, a conventionally ripened raw sausage requires about 14 to 20 days for ripening, depending on its diameter and the type of ripening, until it is ready for sale. Slow ripening is 4 to 8 weeks and more.

Ripening is completed when the water content has fallen below a certain level. It is known that meat and sausage emulsion give off water most rapidly in the time period up to reaching the isoelectric point, i.e. in a time period in which the pH falls from about 5.8 to about 5.3. At the pH 5.3 (isoelectric point of the meat), the meat proteins form a gel which impairs the further release of water. The time period up to reaching the isoelectric point, or the point of maximum coagulation of the meat proteins, is therefore optimum for drying the sausage.

In order to achieve the most rapid possible decrease in water content, casings having a water permeability of 600 to about 1600 g per m$^2$ and a day are used. These are generally cellulose fiber skins or collagen skins. These casings are also used for the production of mold-ripened raw sausage, in particular mold-ripened salami.

In the first 24 hours the pH scarcely falls during the standard ripening (that is without addition of acidulants) and remains constant at about 5.8. By means of a suitable temperature profile, the fall in pH can be further retarded. In this time period the sausage gives off water which escapes as water vapor through the casing.

During what is termed the fermentation phase, in the previous processes the atmospheric humidity is set to about 90 to 95%. In addition, the temperature in the ripening chamber is first slightly increased so that the starter cultures develop more rapidly. Starter cultures used are, in particular, acidifying homofermentative lactic acid bacteria (*Lactobacillus* or *Pediococcus* species) or nitrate-reducing *Staphylococcus* or *Micrococcus* species. Thereafter the relative humidity in the ripening chamber is reduced to about 80 to 90%. The post-ripening (in the case of standard-ripened raw sausage, typically from the 10th day after production) then proceeds at about 75% relative humidity. During ripening the sausage loses about 22 to 35% of its weight by the removal of water.

The water vapor permeability of conventional casings is so high that under not quite optimal ripening conditions, excessive drying out of the outer regions of the sausage occurs, i.e. what is termed a dry rim is formed. The atmospheric humidity is therefore kept very high in the initial phase of drying, generally above 90%. Once a dry rim has formed, it retards the further drying out of the sausage. At a pH at the isoelectric point, the sausage emulsion readily gives off water, at the same time, when this point is reached, gel formation of the meat protein starts which counteracts the release of water. For drying, the most suitable time period is therefore the time period up to reaching the isoelectric point. Using the highly permeable casings which are customary to date, the time period up to reaching the isoelectric point can only be exploited inadequately.

SUMMARY OF ADVANTAGEOUS EMBODIMENTS OF THE INVENTION

The object was therefore to provide a process for the accelerated ripening of raw sausage which succeeds without the addition of glucono-δ-lactone or other acidulants and leads to a marketable high-quality product without dry rim in a shorter time than possible hitherto.

Surprisingly, it has now been found that using casings which have a water vapor permeability of less than 600 g/m$^2$ d, the desired more rapid ripening may be achieved if, at the same time, the atmospheric humidity is decreased at the start of ripening up to achieving the isoelectric point to a maximum of 60% relative humidity (rh). Generally, this relative humidity can be set at a temperature of 4 55° C., but preferably a temperature of about 12 to 18° C. In the preferred temperature range, the growth of microorganisms is delayed, so the isoelectric point is reached later. With the previously customary highly permeable casings, such conditions inescapably lead to the formation of undesired dry rims.

DETAILED DESCRIPTION OF ADVANTAGEOUS EMBODIMENTS OF THE INVENTION

The present invention therefore relates to a process for ripening raw sausages which comprises carrying out the ripening in a casing having a water vapor permeability of less than 600 g/m$^2$ d at a relative humidity of less than 60%. This atmospheric humidity should be maintained from production of the sausage up to reaching the isoelectric point, i.e. about a maximum of 72 hours thereafter.

Preferably, the water vapor permeability of the casing is about 50 to 400 g/m$^2$ d, particularly preferably 70 to 300 g/m$^2$ d, especially 80 to 200 g/m$^2$ d, and in particular about 110 g/m$^2$ d.

In the process according to the invention, casings made of various materials may be used. Preference is given to single-layer or multilayered casings based on thermoplastics. These are, for example, casings made of a mixture which comprises aliphatic polyamides and/or aliphatic copolyamides and additionally at least one organic polymer having a high water solubility (greater than 20 g in 1 liter of water at 80° C.) as disclosed in DE 103 20 327. The polymer having high water solubility is, for example, a polyvinylpyrrolidone or a copolymer having vinylpyrrolidone units, a poly(vinyl alcohol), a poly(alkylene oxide) (for example poly(ethylene glycol) or poly(propylene glycol)), a cellulose ether, poly(meth)acrylic acid or a copolymer having (meth)acrylic acid units. As is customary, "(meth)acrylic acid" means "acrylic acid and/or methacrylic acid".

Suitable casings, although less preferred casings, are also cellulose fiber skins or textile skins, wherein, especially, the textile skins are additionally coated or printed, in order to reduce the water vapor permeability to less than 500 g/m² d. The coating can consist, for example, of one or more acrylic layers.

The textile skins generally comprise a woven fabric, loop-formingly knitted fabric, loop-drawingly knitted fabric, or nonwoven fabric which can consist of natural and/or synthetic fibers. Preferred fiber materials are cotton, regenerated cellulose (viscose staple), silk, polyester, polyamide, polyolefin (in particular polypropylene), poly(vinyl)acetate, polyacrylonitrile, poly(vinyl chloride) and also the corresponding copolymers. Mixtures of various materials may also be used (e.g. mixtures of viscose staple and polyester).

The atmospheric humidity during ripening is preferably 15 to 50% rh, particularly preferably 18 to 40% rh, and in particular 20 to 25% rh. This means that the sausage dries off particularly rapidly. Excessively rapid drying and as a result the formation of dry rims is prevented by the reduced water vapor permeability of the casing.

In the time period up to reaching the isoelectric point, a raw sausage can dry most effectively. Using the previously conventional casings which have a very high water vapor permeability, this time period cannot be utilized optimally.

Using the process according to the invention, the ripening of the raw sausage up to the marketable product can be shortened by at least 24 h.

The present invention further relates to the use of a tubular casing having a water vapor permeability of less than 600 g/m² d in the ripening of raw sausage, in particular in the ripening at a relative humidity of less than 60%, in particular less than 50%.

The examples hereinafter serve to illustrate the invention. Percentages therein are taken to mean percentages by weight, unless stated otherwise or is immediately clear from the context.

EXAMPLE 1 (COMPARATIVE EXAMPLE)

A cellulose fiber skin having a water vapor permeability of 950 g/(m².d) was stuffed with salami emulsion to a stuffing caliber of 63 mm. The sausage was then, as conventional to date, ripened "conventionally". For this it was held in a ripening chamber up to the 2nd day after stuffing at a temperature of 18 to 20° C. and a relative humidity of 90 to 95%. From the 3rd to the 10th day, the relative humidity was set to 80 to 90% at about 18° C. From the 11th day, the relative humidity was then only 75% and the temperature about 15° C.

Overall, the sausage showed a weight loss of 10% in the course of the first 72 hours. After 20 days, the weight loss at the value desired for the marketable product was 27%.

EXAMPLE 2

A casing based on aliphatic polyamides (nylon 6) was used, wherein the polyamide is mixed with polyvinylpyrrolidone. The casing had a water vapor permeability of 90 g/m² d.

The casing was stuffed with salami emulsion to a stuffing caliber of 63 mm. The ripening then proceeded at 20 to 25% relative humidity. The temperature in this case was held at 14° C. from stuffing up to the second day after stuffing, thereafter, (i.e. from the 3rd to the 17th day) at 18 to 20° C.

From the 3rd day after stuffing, the drying rate was constant at 0.2% per hour; the weight loss after expiry of this time period was 14.4%. From the 3rd day, the drying rate decreased to 0.08% per hour. After a further 6.6 days, the weight loss was 27% and had thereby achieved the desired value.

Overall, the ripening period up to the marketable product was thereby only 17.7 days, that is 2.3 days less than by the previous process.

That which is claimed:

1. A process for ripening raw sausages which comprises providing a cased raw sausage in a casing having a water vapor permeability of less than 600 g/m²d and maintaining the cased raw sausage in an atmosphere adjusted to a relative humidity of less than 60% and a temperature ranging from 4 to 20° C. until said sausage has a pH of about 5.3 wherein said process does not include the addition of glucono-δ-lactone or other acidulants.

2. The process as claimed in claim 1, wherein the casing has a water vapor permeability of 50 to 400 g/m²d.

3. The process as claimed in claim 1, wherein the casing has a water vapor permeability of 70 to 300 g/m²d.

4. The process as claimed in claim 1, wherein the casing has a water vapor permeability of 80 to 200 g/m² d.

5. The process as claimed in claim 1, wherein the casing has a water vapor permeability of about 110 g/m²d.

6. The process as claimed in claim 1, wherein the maintaining step begins at sausage production and ends when the sausage has a weight loss of about 22 to 35 wt %.

7. The process as claimed in claim 1, wherein the ripening process is shortened by at least 24 hours in comparison to conventional ripening processes.

* * * * *